United States Patent [19]

Neuzil

[11] 4,384,609
[45] May 24, 1983

[54] EARTH/BLOCK AIR PRECONDITIONER

[76] Inventor: Jack E. Neuzil, R.R. 4, Box 413, Solon, Iowa 52333

[21] Appl. No.: 365,318

[22] Filed: Apr. 5, 1982

[51] Int. Cl.³ .............................................. F24J 3/02
[52] U.S. Cl. .............................. 165/45; 165/DIG. 12
[58] Field of Search ........... 165/45, DIG. 4, DIG. 12

[56] References Cited

U.S. PATENT DOCUMENTS

| | | | |
|---|---|---|---|
| 1,974,244 | 9/1934 | Lapp | 165/45 |
| 2,134,121 | 10/1938 | Harper | 165/45 |
| 2,427,780 | 9/1947 | Haines | 165/45 |
| 4,051,891 | 10/1977 | Harrison | 165/DIG. 4 |
| 4,184,856 | 1/1980 | Thoren | 165/DIG. 12 |

FOREIGN PATENT DOCUMENTS

| | | | |
|---|---|---|---|
| 514673 | 12/1930 | Fed. Rep. of Germany | 165/45 |
| 2814102 | 10/1979 | Fed. Rep. of Germany | 165/DIG. 4 |

OTHER PUBLICATIONS

"Home Features", Cedar Rapids Gazette, Sunday, Aug. 12, 1979.

*Primary Examiner*—Sheldon J. Richter
*Attorney, Agent, or Firm*—Hill, Van Santen, Steadman, Chiara & Simpson

[57] ABSTRACT

An earth/block air preconditioner for use in dwellings and other buildings wherein the outside air is drawn below ground and passed through concrete blocks which are preformed with a pair of openings so that the outside air and inside air from the building are in close proximity so as to heat the outside air during the winter time due to the heat exchange arrangement with the inside air before passing it into the building and to cool the outside air during the summer time before passing it into the building. Modern buildings are insulated so tightly that forced ventilation is desirable and the present invention provides highly efficient heating and cooling or ventilation modes for a heat exchange system.

11 Claims, 7 Drawing Figures

EARTH/BLOCK AIR PRECONDITIONER

BACKGROUND OF THE INVENTION

1. Field of the Invention

This invention relates in general to heating, cooling and ventilating systems for buildings and in particular to a novel air preconditioner system which can be used for example with superinsulated tight homes to remove excess moisture in the winter and to bring fresh air in all year round at the desired temperature. The present invention is not intended to replace the house central heating system, however, it can be used to supply combustion air for the furnace. It can also be used to provide a slight positive pressure on the inside of the house and thus reduce air infiltration.

2. Description of the Prior Art

The energy crisis has resulted in many new materials being used in house constructions and house furnishings which contain chemicals that although cheap and serviceable give off gaseous products that pose threats to the eyes, nose, throat and lungs. Also, certain radioactive gases such as radon is continually escaping from ground that is rich in granite or other uranium-bearing minerals and these substances can accumulate within houses and result in danger to personnel. Also, the recent trend has been to make houses very air-tight as by lining them with vapor barriers such as with polyethylene film and such vapor barriers which have been installed in many homes in North America are very effective in stopping infiltration and greatly reducing heat losses. The use of such barriers is the main technique of obtaining superinsulated houses but the undesirable effects are that the indoor concentrations of polluting gases, moistures and smells become very objectionable and even dangerous.

SUMMARY OF THE INVENTION

The present invention comprises an air to air heat exchange arrangement wherein air from the outside is drawn underground and circulated through cast concrete blocks which act as a good conductor for heat transfer and have a large mass for the storage of heat. These blocks absorb moisture from the exhaust air which is drawn from inside the house and which passes through the blocks in close proximity to the inlet air and condensation forms as the air is cooled to the dew point providing for even better heat transfer from the inlet and outlet chambers or from the earth. The blocks are isolated from the concrete basement wall with insulation such as polystyrene so that the heat will not travel up the wall and out above grade. Insulation which does not absorb moisture is used for this purpose.

The cast concrete blocks are placed edge tight against the insulation with one corner resting on the footing and the other on the gravel covering the footing drain tile and the blocks are placed end to end after a bead of waterproof caulk adhesive is applied around the upper chamber and a plastic coupling is inserted between adjacent blocks. It is necessary to seal the upper inlet chamber to the house so that there will not be a feed through of exhaust air being pumped out of the house into the inlet air where it could return through the inlet. The bottom passage is used for removing the air from the house and it need not be sealed so as to allow condensate to pass from the blocks either through drains or joints between the blocks into the drain tile. The inlet and outlet passages through the blocks are connected by suitable couplings and elbows made of plastic for example, and the ends of such plastic pipe and elbows are inserted into the block and caulked. The plastic pipe inlet and outlet from the house may be placed in the form before pouring the basement wall or, alternatively, a hole must be bored through the wall to facilitate passage of such pipes. Dirt is back filled around the block to a height of 24 inches above the block and another band of polystyrene or other suitable insulation is butted against the wall and extends out horizontally over the back fill.

The depth below grade of the blocks determines the thickness of insulation which is required and a minimum of 1" thickness of 2 lb. per square foot polystyrene should be used for insulation if it is below the frost line. Where this depth is not feasible 2" thickness or more should be used. The function of the insulation is to trap the heat below it in the winter and keep it from going down in the summer. It is desirable to provide a waterproof plastic over the insulation to reduce water passing into the system so that any ground water will go around the blocks and into the footing tiles.

The invention provides not only fresh air in summer and winter but also preconditions the cold outside air in the winter by preheating it due to the heat exchange. Thus, substantially increasing the efficiency of the heating system and preconditions the warm summer air to a cooler temperature due to the heat exchange and thus the heating cost and airconditioning cost will be substantially reduced when using the invention.

The amount of volume of air can be varied by using a damper arrangement and/or by providing variable speed motors in either the input or output motors.

It is an object of the invention to provide a preconditioner for air which is to be circulated into a building such as a house to substantially increase the efficiency of heating and cooling systems.

Other objects, features and advantages of the invention will be apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
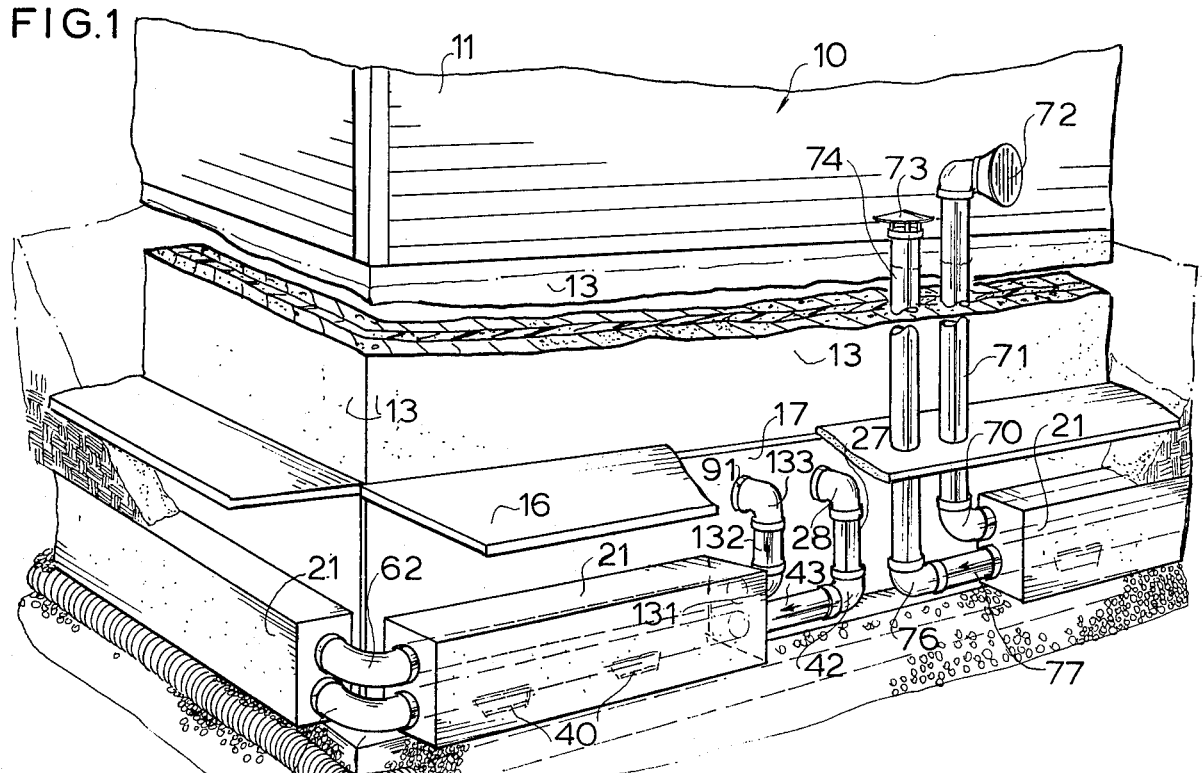
FIG. 1 is a perspective view of the air preconditioner system of the invention.
Figure 2:
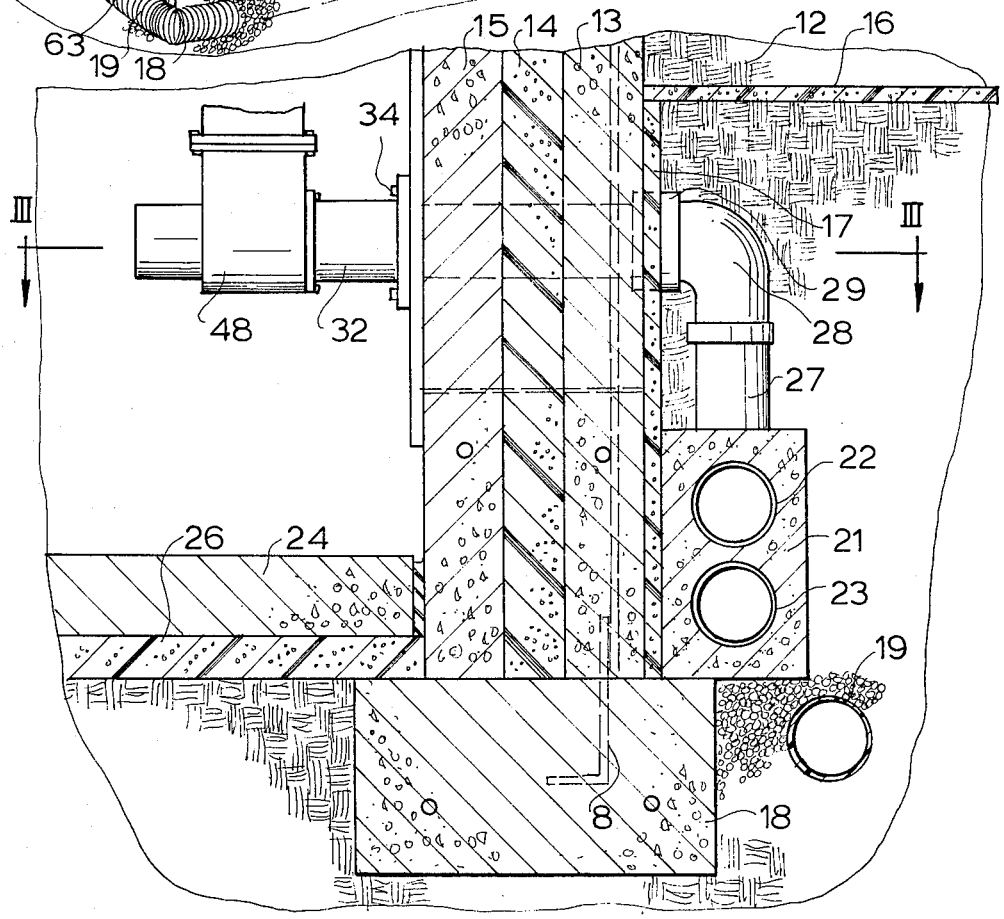
FIG. 2 is a sectional view through the wall of the house and the system of FIG. 1.
Figure 3:
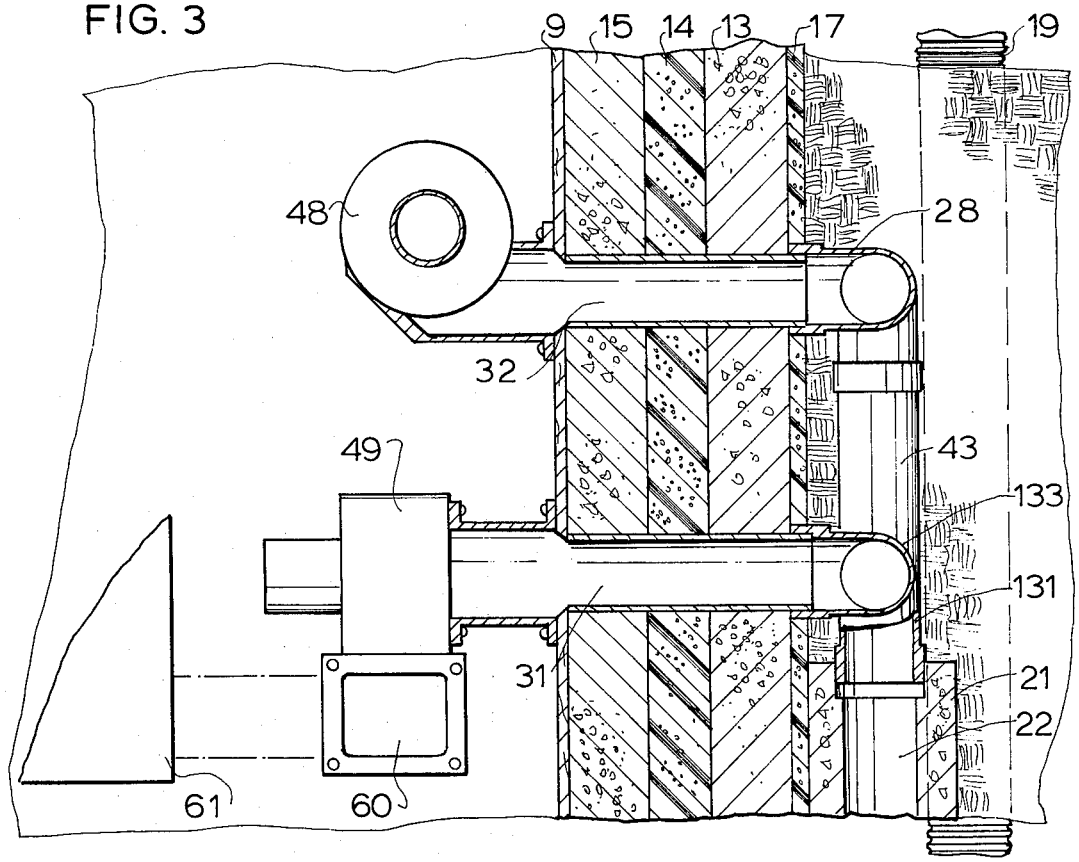
FIG. 3 is a sectional view taken on line III—III from FIG. 2.
Figure 4:
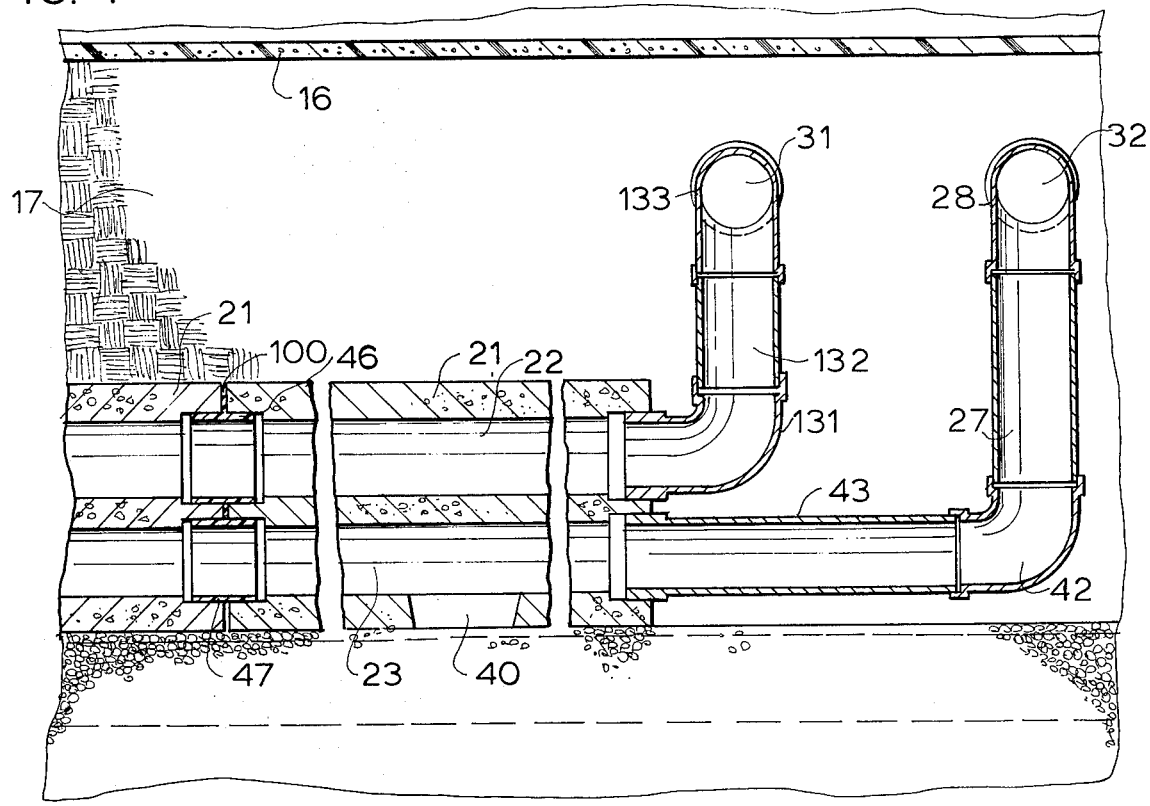
FIG. 4 is a sectional view through the preconditioner.

FIG. 1 illustrates a building 10 as for example a house which has a wall 11 and a foundation such as a below the grade wall 13. As shown in FIGS. 2 and 3, the below the grade wall may comprise an outer wall 13, an insulating layer 14 and an inner wall 15. The walls 13 and 15 might be of concrete, for example, with at least the outer wall 13 reinforced by suitable reinforcing rods 8 which are poured to form the insulating sandwich with the insulating material 14 therebetween. The wall 13, 14 and 15 is formed on a footing 18 which extends out beyond the outer edge of the wall as illustrated in FIG. 2. The inside floor 24 is formed over an insulation layer 26. Especially formed concrete blocks 21 are formed with a pair of horizontal openings 22 and 23 as illustrated in FIGS. 2 and 4. Each of the blocks 21 is formed with the drain openings 40 which communicate with the lower opening 23 so that condensate can pass from the blocks out into the drain field.

The blocks 21 are mounted on the outer corner of the foundation footings 18 as illustrated in FIG. 2 and a layer of insulation 17 is placed between the blocks 21 and the surface of the outer wall 13. A bead of caulk 100 is placed between the blocks around the upper opening 22 and plastic coupling sleeves 46 and 47 can be used to join the blocks as illustrated in FIG. 4. It is desirable that the upper passage 22 be sealed so that the incoming air is not contaminated by the exhaust air but it is desirable that the passageway 33 be porous so that the moisture in the exhaust air can pass through the drains 40.

As illustrated in FIG. 1, drain tile 19 is placed around the foundation footings 18 below the blocks 21. Elbows such as 62 and 63 are used to couple the passages 22 and 23 together between adjacent blocks. As illustrated in FIG. 1, the blocks 21 may extend partially or completely around the house and in the embodiment illustrated in FIG. 1 they extend completely around the house such that the input air passes from an input 72 to a vertical pipe 71 and through an elbow 70 into the upper passage 22. As it passes through the blocks 21 in its circuit around the house, it will be preconditioned or warmed in the winter and cooled in the summer. When the air passes completely around the house it passes from the elbow 131 through the vertical pipe 132 and elbow 133 to a horizontal pipe 31 to an input blower 49 illustrated in FIG. 3. It can also pass through suitable conduit 60 to the input of the furnace 61. An exhaust fan 48 exhausts air from the house and passes it through a horizontal conduit 32, elbow 28, vertical portion 27 and horizontal circuit 43 to the passageway 23 in block 21. The exhaust air during the winter heats the incoming air and in the summer cools the incoming air. Condensate from the exhaust air passes through the drain 40 into the drain system.

The exhaust air passes completely around the house passing through all of the blocks 21 where heat exchange between the inlet and outlet air occurs and then passes to a horizontal pipe 77, elbow 78 and a vertical pipe 74 to the exhaust outlet 73 illustrated in FIG. 1. The insulating sheets 16 are placed above the blocks 21 as illustrated and provide a heat barrier so as to insulate the blocks during summer and winter.

Figure 5:
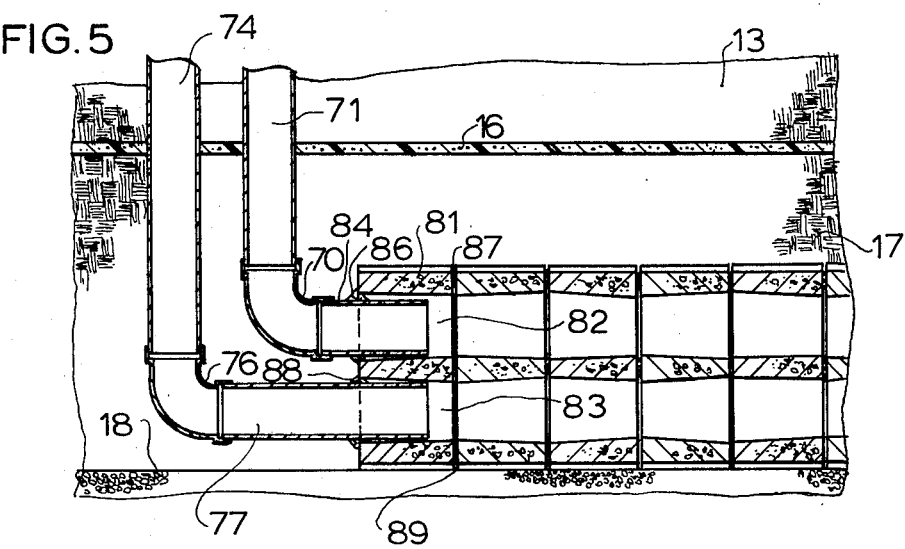
FIG. 5 illustrates a modification of the invention and comprises a sectional view through such embodiment.
Figure 6:
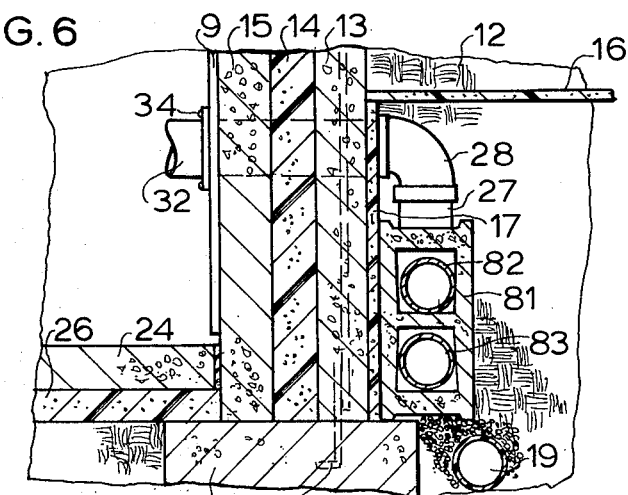
FIG. 6 is a sectional view through the system illustrated in FIG. 5.

FIG. 5 illustrates a modification of the invention wherein the blocks 21 are replaced by conventional concrete blocks 81 which are formed with passages 82 and 83 illustrated in FIGS. 5 and 6. Inlet conduit 71 is coupled to the upper passage 82 and the exhaust conduit 74 is coupled to the lower passage 83. The blocks are joined by suitable caulking material 87 and the blocks are sealed about the upper chamber 82 by caulking material 87 so that the exhaust air passing through passageway 83 will not pass into the inlet passage 82.

The exhaust blower 48 might be a type Datyon 4C447 which can move 265 CFM free air and the blower inlet may be connected to the air vents coming from the bathroom and kitchen, for example. The input blower 49 might be a type Dayton 4C444A capable of moving 350 CFM free air. The discharge from the blower 49 may be ducted into the cold air return on the furnace 61 as illustrated in FIG. 3. Since there is a larger input blower than exhaust blower there will be more air being brought into the house then there is being discharged which will provide a slight positive pressure. The blowers may be sized to govern the air change per hour desired in the house and the specific examples given will bring in 165 CFM or more.

A damper arrangement can be used on the suction side of blower if it is desirable to vary the volume of air needed.

Figure 7:
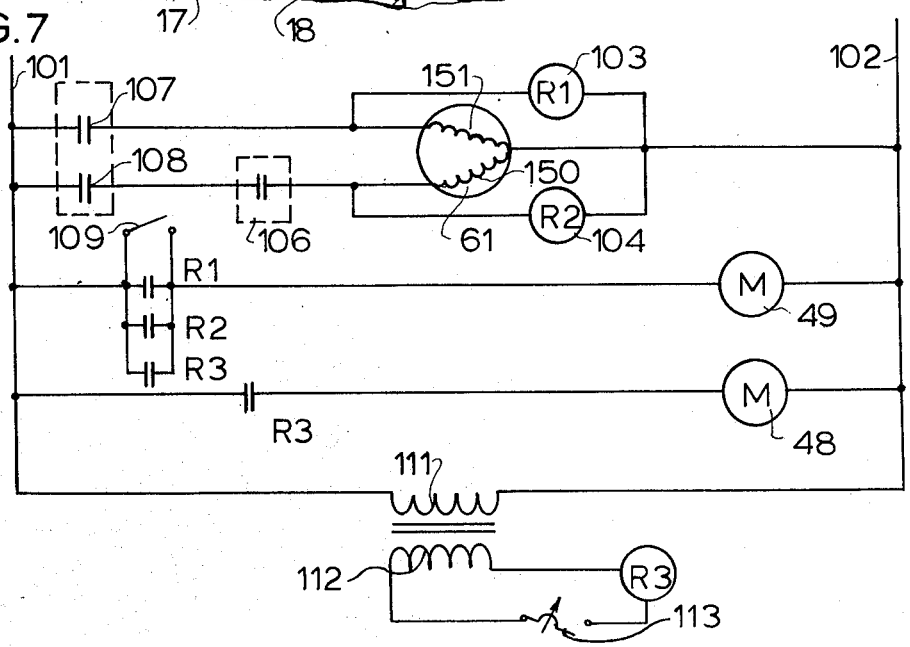
FIG. 7 illustrates an electrical schematic for the control system of the invention.

FIG. 7 is an electrical schematic of the system and power leads 101 and 102 connect to a primary 101 of a transformer which has a secondary 112 that is connected to a humidistat which can be set to the desired humidity in the building such that contacts 113 will close when the humidity is above the setting. When contacts 113 close, a relay R3 will be energized which closes switch contacts R3 which is in series with the exhaust motor 48 so as to energize it when the contact 113 is closed. Also, a contact R3 in series with the inlet motor 49 is closed when contact 113 is closed thus energizing the inlet motor 49. A manual switch 109 is provided in series with the inlet motor 49 so that the motor 49 can be manually energized when desired.

In the heating mode the fan switch 106 will close which will energize the low speed coil 150 of the furnace motor and also relay R2 will be energized. Relay R2 closes contact R2 in series with the inlet fan motor 49 to energize it.

In the cooling and/or ventilating mode when the normally open contact 107 on the indoor fan relay closes it energizes the high speed furnace blower coil 151 of the furnace motor as well as relay R1 which closes contact R1 in series with the inlet fan motor to energize it.

The following chart illustrates data taken over a period of time with different outside temperatures and illustrates an exhaust air temperature as well as the inlet fresh air temperature.

It is seen that the present invention provides a novel air preconditioner which is very efficient and is capable of substantially reducing the cost of heating during the winter and cooling during the summer.

Although the invention has been described with respect to preferred embodiments thereof, it is not to be so limited as changes and modifications may be made therein which are within the full intended scope as defined by the appended claims.

| | EXHAUST AIR | | | INLET FRESH AIR | | | |
|---|---|---|---|---|---|---|---|
| Date/Time | Inside House Temp. | Outside Discharge Temp. | Air Flow CFM | Outside Inlet Temp. | Inside Discharge Temp. | Air Flow CFM | Comments |
| 1-27- 10:00 | 72° | 34° | 77 CFM | 30° | 58° | 94 CFM | Started System |

-continued

| | | EXHAUST AIR | | | INLET FRESH AIR | | |
|---|---|---|---|---|---|---|---|
| Date/Time | Inside House Temp. | Outside Discharge Temp. | Air Flow CFM | Outside Inlet Temp. | Inside Discharge Temp. | Air Flow CFM | Comments |
| 12:30 | 72 | 32 | | 30 | 58 | | |
| 28- 9:20 | 65 | 28 | | 2 | 56 | | |
| 12:30 | 68 | 28 | | 5 | 56 | | |
| 29- 8:30 | 66 | 28 | | 16 | 56 | | |
| 12:45 | 65 | 28 | | 16 | 58 | | |
| 1-30-31 No Readings | | | | | | | |
| Feb. 1, 9:00 | 66 | 26 | | −8 | 55 | | |
| 2 9:15 | 65 | 28 | | 6 | 58 | | |
| 3 8:30 Turned Exhaust Fan Off | | | | −8 | 56 | | |
| 12:30 | | | | −5 | 55 | | |
| 4 8:15 | 68 | | | −15 | 54 | | |
| 12:30 | 66 | −8 | | −10 | 54 | | |
| 2:00 | 66 | −6 | | −8 | 54 | | Set thermostat at 50° |
| 5 8:30 | 64 | | | −6 | 54 | | Turned off Furnace |
| 12:30 | 63 | | | −2 | 52 | | |
| 2:00 | 64 | | | −4 | 54 | | |
| 6 9:30 | 56 | | | −12 | 51 | | |
| 5:30 | 59 | | | 0 | 51 | | |
| Feb. 7 9:30 | 56 | | | +3 | 50 | | |
| Sunday 12:30 | 58 | | | 10 | 50 | | |
| 4:30 | 60 | | | 12 | 52 | | Set Thermostat 65 turned on Furnace |
| 2-8 8:15 | 68 | | | 0 | 52 | | |
| 12:30 | 65 | | | 8 | 54 | | |
| 2:00 | 65 | | | 8 | 54 | | |
| 9 | | | | | | | |
| 10 | | | | | | | |
| 11 9:00 | 68 | | | 30 | 55 | | |
| 2-12 11:00 | 68 | | | 19 | 56 | | Thermostat set 50° Ran Furnace Blower |
| 2:00 | 68 | | | 26 | 56 | | |
| Sat 13 9:30 | 64 | | | 26 | 54 | | |
| 5:30 | 65 | | | 32 | 54 | | |
| Sun 14 9:30 | 60 | | | 29 | 52 | | |
| 2:00 | 62 | | | 38 | 52 | | |
| 2/15 8:30 | 58 | 8:00 A.M. Turned Exh. on | | 33 | 55 | | Set Thermostat at 65° |
| 10:00 | 62 | | 60 CFM | 35 | 55 | 165 CFM | Noanson Control Readings |
| 1:15 | 66 | | | 44 | 55 | | |
| 2/16 8:00 | 63 | | | 36 | 56 | | |
| 1:45 | 70 | | | 34 | 54 | | |
| 17 8:15 | 70 | | | 30 | 58 | | |
| 1:45 | 70 | | | 31 | 58 | | |
| 2/18 8:00 | 70 | | | 31 | 60 | | |
| 19 8:10 | 65 | | | 31 | 59 | | Term. set 50° |
| Sat 20 10:00 | 70 | | | 40 | 59 | | |
| 21 | | | | | | | |
| 22 9:30 | 70 | | | 40 | 59 | | |
| 2/23 8:30 | 72 | | | 38 | 59 | | |
| 23 2:00 | 75 | | | 36 | 56 | | |
| 24 8:30 | 75 | | | 29 | 60 | | |
| 2:00 | 75 | | | 31 | 60 | | |

I claim as my invention:

1. An air preconditioning system for a building comprising a heat exchanger mounted in the ground beneath ground level externally along the wall of said building and formed with first and second air passages, an air inlet for supplying outside air to said first air passage, an air exhaust for removing air from said second air passage, said first and second air passages communicating with the inside of said building to supply air to and remove air from said building, air impeller means for drawing air from said first passage into said building and for exhausting air into said second passage from said building and said heat exchanger made of concrete so that heat can flow beneath air in said first and second passages to provide heating of the outside air in cold weather and cooling of the outside air in warm weather.

2. An air preconditioning system according to claim 1 wherein said second passage is formed with at least one drain opening so that condensate can be removed from said second passage.

3. An air preconditioning system according to claim 2 wherein said heat exchanger is formed of precast concrete blocks with said two passages formed therethrough and sealing means sealing at least said first passage so that air will not pass from said second passage into said first passage.

4. An air preconditioning means according to claim 3 comprising a drain tile field mounted adjacent said heat exchanger to remove moisture from said second passage.

5. An air preconditioning means according to claim 4 including conduit forming portions of said first and second passages from said heat exchanger to the inside of said building and to above grade so that air can be moved into and out of said building.

6. An air preconditioning means according to claim 5 including a first insulation layer mounted between said heat exchanger and the external wall of said building below ground level.

7. An air preconditioning means according to claim 6 including a second insulation layer mounted above said heat exchanger below ground and extending substantially to said external wall of said building.

8. An air preconditioning means according to claim 5 wherein said concrete blocks are substantially larger in the horizontal direction than they are in the vertical direction and said first and second passages extend horizontally therethrough.

9. An air preconditioner according to claim 5 wherein said concrete blocks are substantially larger in the vertical direction than they are in the horizontal direction and said first and second passages extend horizontally therethrough.

10. An air preconditioning means according to claim 1 wherein said air impeller means comprises an inlet fan mounted in said first passage to draw air into said building.

11. An air preconditioning means according to claim 1 wherein said air impeller means comprises an exhaust fan mounted in said second passage to remove air from said building.

* * * * *